United States Patent [19]

Rinkewich

[11] Patent Number: 5,047,193
[45] Date of Patent: Sep. 10, 1991

[54] METHOD AND APPARATUS FOR MAKING HONEYCOMB STRUCTURES

[76] Inventor: Isaac Rinkewich, 48-22 Garden View Ter., Hightstown, N.J. 08520

[21] Appl. No.: 160,000

[22] Filed: Feb. 24, 1988

Related U.S. Application Data

[63] Continuation-in-part of Ser. No. 25,052, Mar. 12, 1987, abandoned.

[51] Int. Cl.$^5$ .............................................. B29C 47/90
[52] U.S. Cl. ................................ 264/155; 156/244.11; 156/244.27; 264/173; 264/177.12; 425/114; 425/308; 425/327
[58] Field of Search ........ 264/150, 148, 149, 165–166, 264/511, 172–173, 155, 177, 12; 425/308, 327, 388, 71, 113–114; 156/244.11–244.14, 244.27

[56] References Cited

U.S. PATENT DOCUMENTS

| | | | |
|---|---|---|---|
| 2,410,744 | 11/1946 | Powers | 264/173 |
| 2,926,729 | 3/1960 | Zanini | 264/149 |
| 3,088,166 | 5/1963 | Colombo | 264/172 |
| 3,137,602 | 6/1964 | Lincoln | 264/150 |
| 3,432,885 | 3/1969 | Zanini | 425/327 |
| 3,668,288 | 6/1972 | Takahashi | 264/566 |
| 3,810,798 | 5/1974 | McCoy | 156/244.11 |
| 3,825,641 | 7/1974 | Barnett | 425/71 |
| 3,895,085 | 7/1975 | Suzuki et al. | 264/172 |
| 4,261,777 | 4/1981 | Vetter et al. | 156/244.27 |
| 4,661,186 | 4/1987 | De Bernardi | 156/244.11 |

FOREIGN PATENT DOCUMENTS 2354162  4/1975  Fed. Rep. of Germany ...... 264/172

Primary Examiner—Jeffery Thurlow
Attorney, Agent, or Firm—Benjamin J. Barish

[57] ABSTRACT

Method and apparatus for making a honeycomb structure including a honeycomb core in which a plurality of preformed honeycomb core elements are moved through an extrusion machine, while a layer of a plastic material is simultaneously extruded over the opposite faces of the honeycomb core elements.

15 Claims, 3 Drawing Sheets

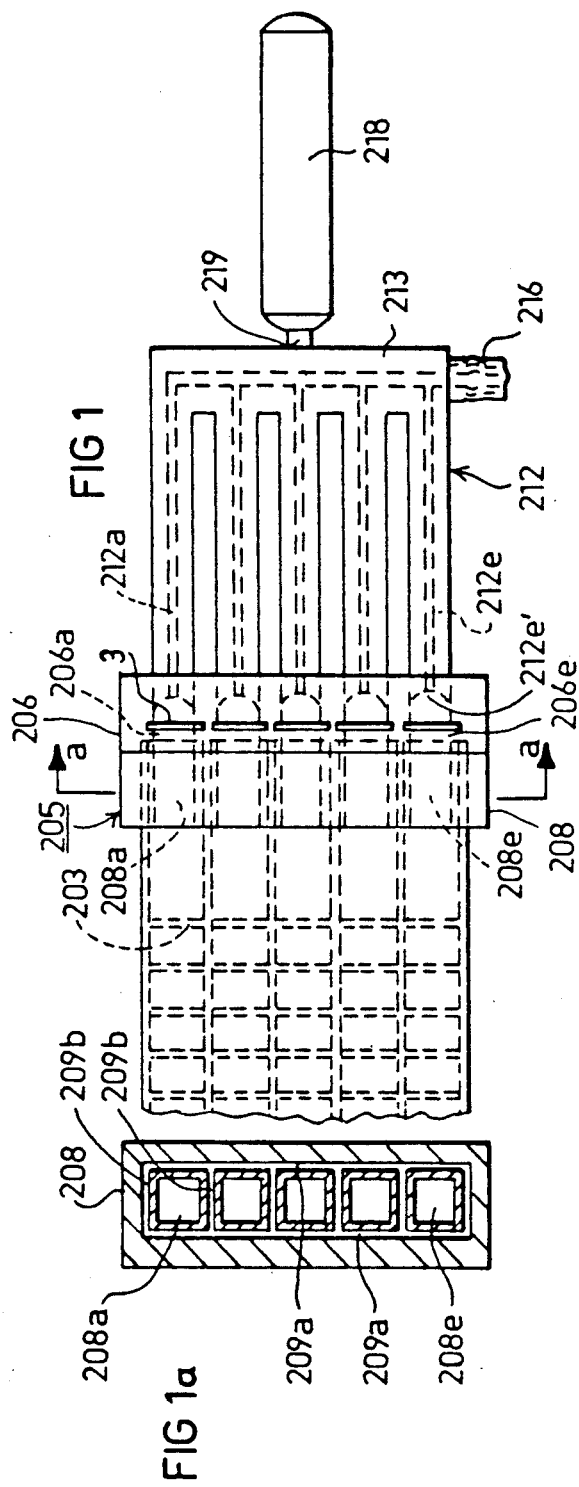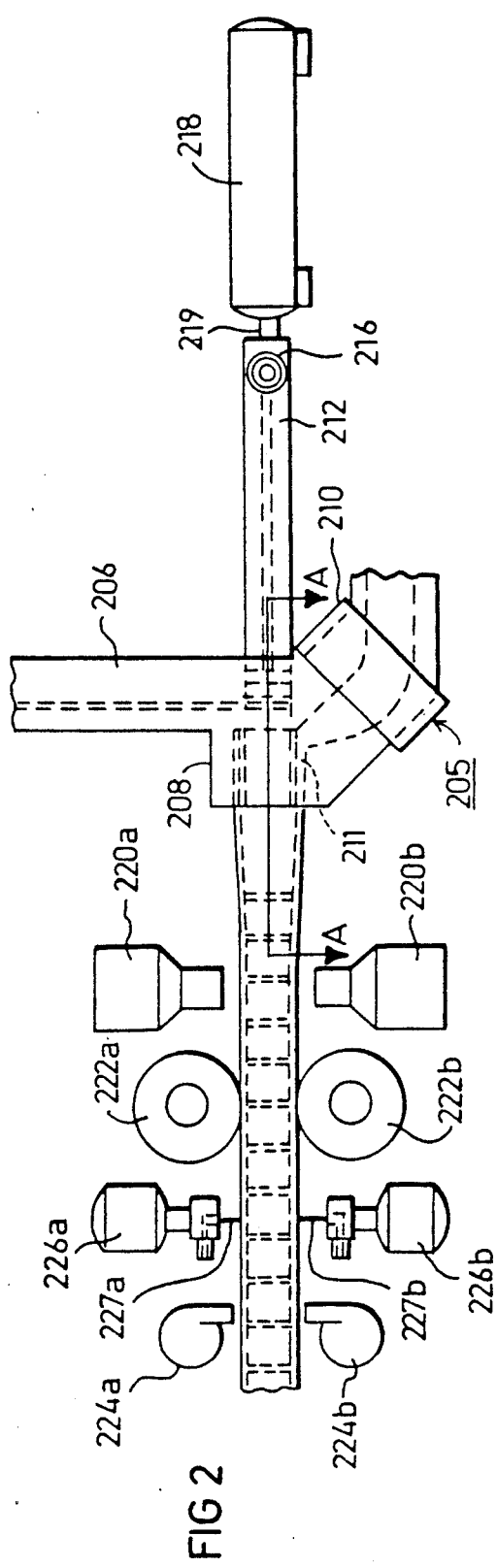

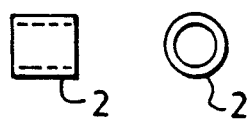   
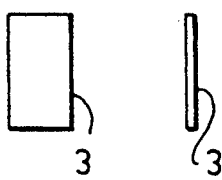 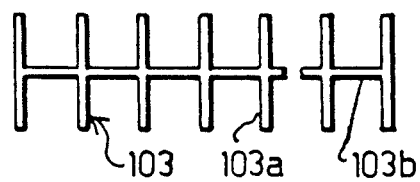  
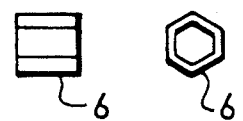 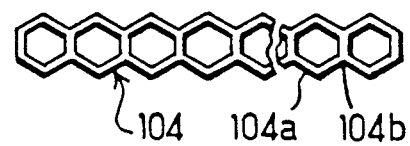 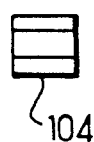 
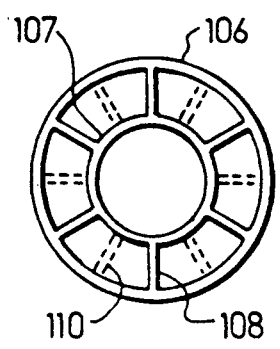 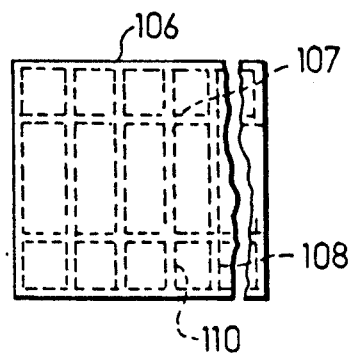
FIG 10  FIG 11

METHOD AND APPARATUS FOR MAKING HONEYCOMB STRUCTURES

RELATED APPLICATION

The present application is a continuation-in-part of U.S. application Ser. No. 07/025,052, filed Mar. 12, 1987, now abandoned.

BACKGROUND OF THE INVENTION

The present invention relates to a method and apparatus for making honeycomb structures.

Honeycomb structures are commonly used in constructing building walls and roofs, containers, truck bodies, rafts, boats, silos, airplane wing sections, high pressure pipes, and like, where it is desired to achieve the greatest strength relative to weight. The present techniques for fabricating such honeycomb structures are slow and costly, since they usually involve the tedious work of manual welding, gluing or cementing the various elements to produce the honeycomb construction.

An object of the present invention is to provide a method, and also an apparatus, for making honeycomb structures in a manner permitting high-volume low-cost production.

BRIEF SUMMARY OF THE INVENTION

According to the present invention, there is provided a method of making a honeycomb structure including a honeycomb core and facing layers on its opposite sides, comprising: feeding to an extrusion head a plurality of preformed core elements in alignment with each other in the transverse direction with a space between each pair of adjacent core elements; and extruding material over the opposite sides of said core elements and in the spaces between said core elements to produce a honeycomb structure having transversely-extending ribs defined by said core elements, and longitudinally-extending ribs defined by the material extruded in said spaces between the core elements.

In the preferred embodiments of the invention described below, the honeycomb structure is pulled from the extrusion machine by pulling and sizing rollers which engage the outer faces of the honeycomb structure and squeeze them towards each other to thereby also bond the face layers to the honeycomb core elements, In addition, the extruded facing layers are heated to soften them, particularly their inner surfaces and the outer surfaces of the honeycomb core elements, to promote their fusion, and are then cooled to control their shrinkage onto the honeycomb core element.

The invention also provides apparatus for producing a honeycomb core in accordance with the above method.

It will thus be seen that the method and apparatus of the present invention may be used for making honeycomb structures in a manner which is continuous and lends itself to high-volume low-cost production.

Further features and advantages of the invention will be apparent from the description below.

BRIEF DESCRIPTION OF THE DRAWINGS

The invention is herein described, by way of example only, with reference to the accompanying drawings, wherein:

FIG. 1 is a top plan view illustrating one form of apparatus constructed in accordance with the present invention;

FIG. 1a is a sectional view along line a—a of FIG. 1;

FIG. 2 is an end elevational view of the apparatus of FIG. 1;

FIGS. 4-6 are end elevational views illustrating three types of core elements which may be used with the apparatus of FIG. 1;

FIGS. 4a-6a are side elevational views illustrating the core elements of FIGS. 4-6, respectively;

FIGS. 7-9 illustrate core elements similar to those of FIGS. 4-6, respectively, but in cluster form;

FIGS. 7a-9a are side elevational views illustrating the cluster strips of FIGS. 7-9, respectively;

FIGS. 7b-9b are views similar to those of FIGS. 7a-9a but illustrating modifications in the structure of the cluster strips of FIGS. 7-9;

FIG. 10 is an end elevational view illustrating a tubular honeycomb structure produced according to the invention; and FIG. 11 is a side elevational view of the structure of FIG. 10.

DESCRIPTION OF PREFERRED EMBODIMENTS

Figure 3A:
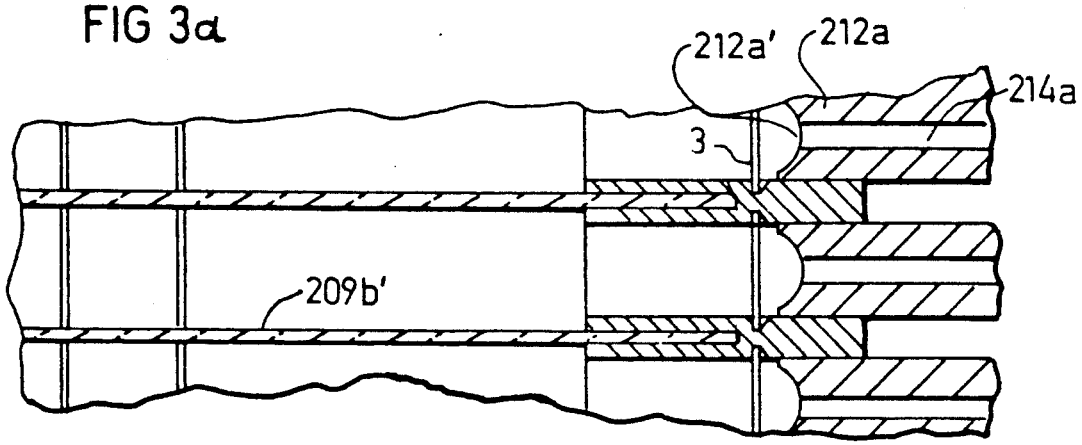
FIGS. 3a, 3b and 3c are enlarged sectional views along line A—A of FIG. 2 during three different stages of operation of the apparatus.

FIGS. 1-3c illustrate a method and apparatus for making a honeycomb structure in which the honeycomb core is constituted of a plurality of core elements as illustrated in FIGS. 4-9 fed from individual hoppers and bonded together by the extruded plastic layers. The core elements may be of tubular configuration as indicated at 2 in FIGS. 4, 4a, of linear configuration as indicated at 3 in FIGS. 5 and 5a, or of hexagonal configuration as indicated at 6 in FIGS. 6 and 6a.

Instead of having the core elements, e.g. 2, as individual elements fed from a plurality of individual hoppers, these elements may be interconnected in the form of a cluster strip, in which case they would be fed from a single hopper. FIG. 7 illustrates a cluster strip 102 constituted of a plurality of tubular elements 102a, each of the configuration of tubular element 202 in FIGS. 4, 4a but interconnected together as shown at 102b; FIG. 8 illustrates a cluster strip 103 constituted of a plurality of linear elements 103a, each corresponding to linear element 3 in FIGS. 5, 5a but interconnected together by ribs 103b; and FIG. 9 illustrates a cluster strip 104 constituted of a plurality of elements 104a of hexagonal configuration and interconnected together at 104b.

The cluster strips may be formed with flat outer faces and of uniform thickness, as shown at 102-104 in FIGS. 7a-9a respectively; alternatively, they may be formed with curved outer faces and/or of tapering thickness, as shown at 102'-104' in FIGS. 7b-9b, respectively. The former constructions (FIGS. 7a-9a) are particularly useful for producing sheet-like honeycomb structures, and the latter constructions (FIGS. 7b-9b) are particularly useful for producing tubular honeycomb structures.

FIGS. 10 and 11 illustrate a tubular honeycomb structure constituted of a plurality of cluster elements 103 as illustrated in FIG. 8b. When such cluster elements are fed through the extrusion head, described below with reference to FIGS. 1-3c, in the form of an annular array, the plastic material extruded from the extrusion nozzle encloses the outer and inner surfaces of the tubular honeycomb structure as shown at 106 and 107, respectively, and also fills the spaces between the cluster elements to form radial ribs 108. There is thus produced a honeycomb tubular structure formed with outer and inner facing layers 106, 107 interconnected by radially-extending ribs, 108 of the extruded material, and further radially-extending ribs 110 of the core elements (e.g. 103b of FIG. 8) in the original cluster strips. The latter ribs 110 are oriented between ribs 108 of the cluster strips for mechanical strengthening purposes.

The apparatus illustrated in FIGS. 1–3c uses the linear core elements 3 shown in FIGS. 5, 5a, but could also use the other core elements shown in FIGS. 4, 4a, and 6, 6a, as well as the cluster-type elements shown in FIGS. 7–9, depending upon the particular application.

As shown in FIGS. 1 and 2, a plurality of the linear core elements 3 (FIGS. 5, 5a) are gravity-fed to an extrusion head 205 from vertically-extending hoppers 206 disposed in side-by-side relationship across the width of the honeycomb structure to be produced. The exit end of the extrusion head 205 is formed with an extension 208 enclosing square-shaped cavities 208a–208e, each aligned with one of the hoppers 206a–206e. Each cavity is spaced from the inner face of the extension 208 by a space 209a (FIG. 1a), and from each other by another space 209b. The extrusion head 205 further includes an extrusion nozzle 210 for extruding plastic material 211 into spaces 209a, 209b.

The plastic material extruded into spaces 209a forms the two continuous face layers of the honeycomb structure, while the plastic material extruded into spaces 209b forms longitudinally-extending ribs between the face layers. During this extrusion, the linear core elements 3 are positioned between the longitudinally-extending ribs in spaces 209b so as to define the transversely-extending ribs of the honeycomb core between the face layers.

The core elements 3 are fed between the extruded face layers by a pusher head 212 formed with a plurality of parallel fingers 212a–212e each aligned with one of the hoppers 206a–206e. The tip of each pusher fingers 212a–212e is curved, as shown at 212e'; in addition, each finger is formed with a bore (e.g., 214a–314c, FIGS. 3a–3c) connected via a manifold 213 to a vacuum source 216. The vacuum source is sufficient not only to firmly retain the core elements 3 against the curved tips of fingers 212a–212e, but also to distort the core element 3 to the curved configuration of the respective tip. Pusher head 212 is reciprocated by a hydraulic or pneumatic cylinder 218 coupled thereto by a rod 219.

The arrangement is such that each finger 212a–212e of the pusher head 212 pushes core element 3 through the respective cavity 208a–208e of extrusion head 205 as plastic material 211 (FIG. 2) is extruded via the extrusion nozzle 210 into the spaces 209a and the two end spaces 209b to enclose all the core elements 3 as they are pushed through their respective cavities, and also into spaces 209b between the cavities. The plastic filling spaces 209a forms the two opposed facing layers of the produced honeycomb structure, while the plastic filling the spaces 209b forms longitudinally-extending ribs bonded to the core elements 3 between the facing layers.

During the forward stroke of the pusher head 212, the curved tips e.g., 212a' of its fingers 212a–212e are connected to the vacuum source 216 so that the core elements 3 are firmly retained against the curved tips while the pusher head 212 is moved forwardly (leftwardly, FIG. 2) by the cylinder 218, and while the plastic 211 is extruded via nozzle 210 to enclose the core elements and also to fill the spaces (209b) between them. As soon as one line of the core elements 3 have been pushed through the cavities 208a–208c of the extrusion head 104 and enclosed by the extruded plastic material 211, the pusher fingers 212a are disconnected from the vacuum source, and the pusher head 212 is quickly returned to its initial position for engagement with the next line of core elements 3.

Figure 3B:
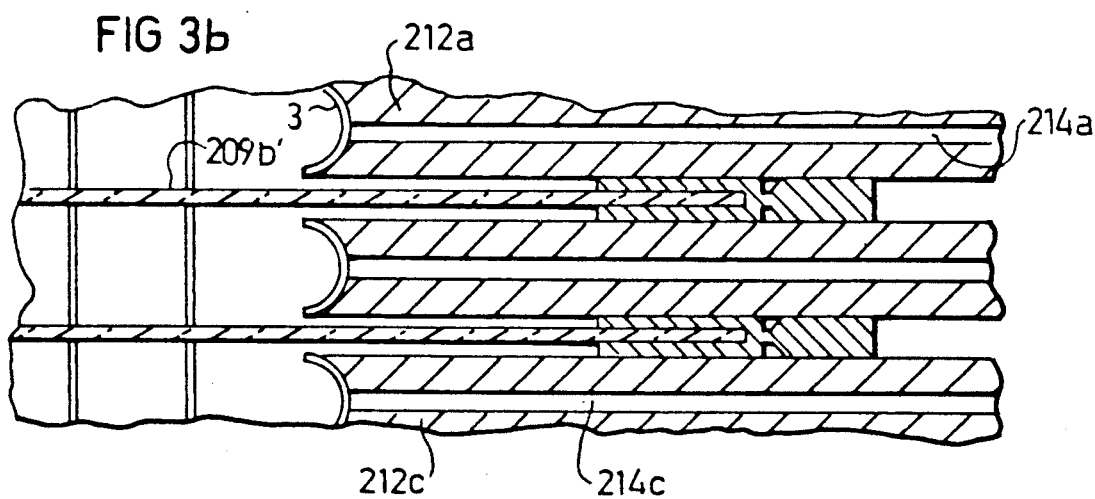
Figure 3C:
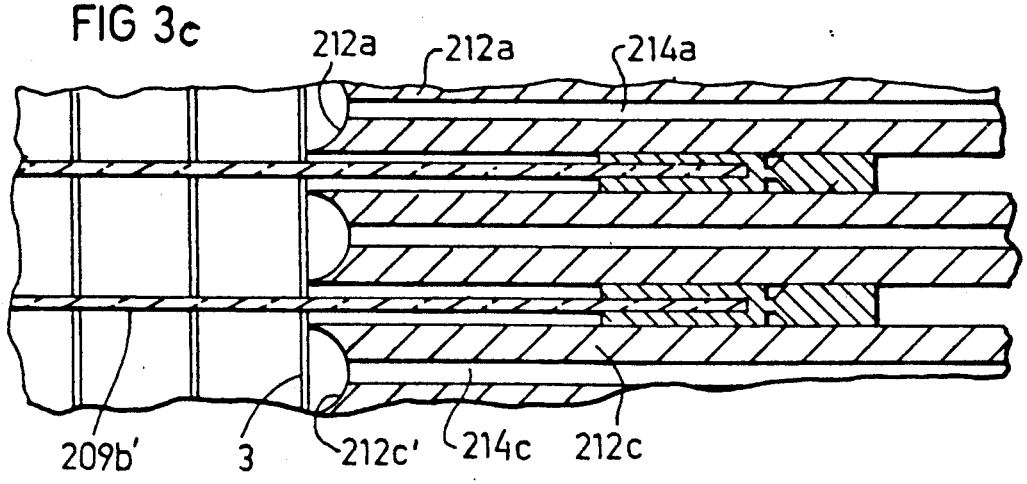

The above operation of the apparatus of FIGS. 1 and 2 is more particularly illustrated in FIGS. 3a–3c.

FIG. 3a shows the curved tip 212a' of finger 212a still spaced from the respective linear core element 3, so that the latter is in its normal linear condition. FIG. 3b illustrates the condition of the finger after suction has been applied via its bore 214a so that the core element 3 is not only gripped by the curved tip of the finger, but is also deformed by the curvature of the tip; this allows the finger to move the core element 3 between the two longitudinally-extending ribs 209b' on its opposite sides, which ribs were extruded in the spaces 209b at the same time that the two facing layers were extruded in spaces 209a of the extrusion head extension 208 (FIG. 14a). After the core element 3, in its curved condition, has been properly located by its respective finger 212a, the suction in its respective bore 214a is terminated, whereupon the core element 3 returns to its normal linear condition, as shown in FIG. 3c, so as to completely bridge the space between, and to be connected to, the two longitudinally-extending ribs 209b' on its opposite sides. The respective finger 212a may then be retracted to its initial position illustrated in FIG. 3a.

The apparatus illustrated in FIGS. 1, 1a and 2 includes, at the exit end of the extruder head 208, heating means 220a, 220b, such as a laser, an induction heater, or a sonic vibration heater, for softening the inner surfaces of the extruded plastic 211 of the two face layers as well as the outer surfaces of the longitudinally-extending ribs and of the core elements 3 to promote their fusion to and integration with the core elements. The apparatus further includes pulling and sizing rollers 222a, 222b, which pull the honeycomb structure form the extrusion head extension 208 and at the same time squeeze the structure to promote adhesion of the outer plastic layers and the longitudinally-extending ribs 209b to the core elements 3; and cooling fans 224a, 224b, which cool the honeycomb structure exiting from the extrusion head 208 and shrink the plastic face layers to cause them to firmly to anchor and fuse with the core elements 3. By controlling the pulling rate, the shrinkage rate may be controlled; this influences the effectiveness of the fusion of the core elements to the plastic facing layers and to the extruded longitudinally-extending ribs.

The arrangement illustrated in FIG. 2 further includes pneumatic cylinders 226a, 226b on opposite sides of the honeycomb structure between the sizing rollers 222a, 222b and the cooling fans 224a, 224b, which apply a vacuum through their respective needles 227a, 227b into each cell that is created by inserting and fusing the core elements 3. The needles 227a, 227b thus reduce the pressure within these cells. They are advanced and retracted at very high speed in order not to deform the extruded plastic layer, and are sufficiently flexible to bend slightly to accommodate the movement of the honeycomb structure without deforming the needles or the honeycomb structure. The holes created by needles 227a, 227b self-seal as soon as the needles are withdrawn, because the material is still semi-liquid, warm and pliable, at this stage before being cooled by the cooling fans 224a, 224b.

While the apparatus of FIGS. 1–3C has been described particularly with respect to the use of the linear type core elements 3, it will be appreciated that other configurations of core elements may be used, such as the tubular type 2 or the hexagonal type 6 of FIGS. 4 and 6, respectively. Instead of deforming the elements by suction, they can be deformed merely by the force applied to their opposite ends during the extrusion operation and spring back to their normal shape by their inherent resiliency. Many other variations, modifications and applications of the invention will be apparent.

What is claimed is:

1. A method of making a honeycomb structure including a honeycomb core and facing layers on its opposite sides, comprising:

feeding to an extrusion head a plurality of preformed core elements in alignment with each other transversely of the extrusion head with a space between each pair of adjacent core elements;

and extruding material over the opposite sides of said core elements and in the spaces between said core elements to produce a honeycomb structure having transversely-extending ribs defined by said core elements, and longitudinally-extending ribs defined by the material extruded in said spaces between the core elements.

2. The method according to claim 1, wherein each of said plurality of core elements is of linear configuration.

3. The method according to claim 2, wherein said core elements are normally of a straight-line configuration, are flexed to a curved configuration to permit insertion between the longitudinally-extending ribs extruded with the facing layer, and are permitted to return to their straight-line configuration after insertion between said longitudinally-extending ribs extruded with said facing layer.

4. The method according to claim 1, wherein said honeycomb core elements are of tubular shape.

5. The method according to claim 1, wherein said honeycomb core elements are of hexagonal shape.

6. The method according to claim 1, wherein the honeycomb structure is pulled from the extrusion machine by pulling and sizing rollers which engage the outer faces of the honeycomb structure and squeeze them towards each other to thereby also bond the facing layers to the honeycomb core elements.

7. The method according to claim 1, wherein the extruded facing layers and the honeycomb core elements are heated to soften them and to promote their fusion to the honeycomb core elements, and are then cooled to control their shrinkage onto the honeycomb core elements.

8. The method according to claim 7, wherein the heat is applied to soften substantially only the inner surfaces of the facing layers and the outer surfaces of the honeycomb core elements.

9. The method according to claim 1, wherein at least one facing layer is pierced by rapidly advancing and retracting needles which reduce the 10. Apparatus for making a honeycomb structure including a honeycomb core having a facing layer on its opposite faces, comprising:

an extrusion head elongated in the transverse direction;

feeder means for feeding to said extrusion head a plurality of core elements in alignment with each other transversely of the extrusion head with a space between each pair of adjacent core elements;

and means for extruding through said extrusion head material over the opposite sides of said core elements and in the spaces between said core elements to produce a honeycomb structure having transversely-extending ribs defined by said core elements, and longitudinally-extending ribs defined by the material extruded in said spaces between the core elements.

11. The apparatus according to claim 10 wherein said feeding means comprises a pusher head engageable with said core elements, and vacuum means for applying vacuum between said pusher head and said core elements.

12. The apparatus according to claim 10 further including pulling and sizing rollers engageable with the opposite faces of the honeycomb structure to pull same from the extrusion head and also to squeeze together and bond the face layers to the core.

13. The apparatus according to claim 10, further including heating means downstream of the extrusion head for softening said facing layers and for promoting their fusion to the core elements and cooling means downstream of the heating means for cooling the facing layers and thereby controlling their shrinkage on the core elements.

14. The apparatus according to claim 10, wherein said heating means softens substantially only the inner surfaces of the facing layers and the outer surfaces of the core elements.

15. The apparatus according to claim 10, further including a plurality of rapidly advancing and retracting needles located to pierce at least one facing layer in order to reduce the pressure within the cells produced by the core elements and the facing layers.

* * * * *